(12) United States Patent
Kesten et al.

(10) Patent No.: US 8,191,584 B2
(45) Date of Patent: Jun. 5, 2012

(54) METHOD AND DEVICE FOR FILLING PRESSURE CONTAINERS WITH LOW-BOILING PERMANENT GASES OR GAS MIXTURES

(75) Inventors: Martin Kesten, Rosrath (DE); Friedel Michel, Erkrath (DE)

(73) Assignee: L'Air Liquide Societe Anonyme pour l'Etude et l'Exploitation des Procedes Georges Claude (FR)

( * ) Notice: Subject to any disclaimer, the term of this patent is extended or adjusted under 35 U.S.C. 154(b) by 2116 days.

(21) Appl. No.: 10/471,926

(22) PCT Filed: Feb. 18, 2002

(86) PCT No.: PCT/EP02/01710

§ 371 (c)(1),
(2), (4) Date: Jun. 6, 2007

(87) PCT Pub. No.: WO02/066884

PCT Pub. Date: Aug. 29, 2002

(65) Prior Publication Data

US 2008/0016884 A1     Jan. 24, 2008

(30) Foreign Application Priority Data

Feb. 20, 2001 (DE) .................................. 101 07 895

(51) Int. Cl.
*B65B 1/04* (2006.01)

(52) U.S. Cl. .................. 141/3; 141/11; 141/20; 141/82; 62/50.2

(58) Field of Classification Search ................ 141/3, 11, 141/20, 82; 62/50.2
See application file for complete search history.

(56) References Cited

U.S. PATENT DOCUMENTS

| 2,075,408 | A | * | 3/1937 | Sholes | 62/50.1 |
| 2,536,322 | A | * | 1/1951 | Smith | 141/82 |
| 2,671,590 | A | * | 3/1954 | McBean et al. | 141/3 |
| 2,780,899 | A | * | 2/1957 | Benson et al. | 53/268 |
| 4,556,091 | A | * | 12/1985 | Poulsen | 141/82 |
| 4,761,961 | A | * | 8/1988 | Marx | 62/50.2 |
| 6,874,547 | B1 | * | 4/2005 | Dorr et al. | 141/83 |
| 7,490,635 | B2 | * | 2/2009 | Grabhorn et al. | 141/2 |

* cited by examiner

*Primary Examiner* — Timothy L Maust
(74) *Attorney, Agent, or Firm* — Connolly Bove Lodge & Hutz LLP

(57) ABSTRACT

On cold filling of pressure containers the filling gas is cooled before introduction into the pressure container to be filled. On completion of the filling process the pressure container is sealed in a pressure-tight manner. As the gas warms up the pressure in the pressure container rises rapidly. According to the invention, the pressure container is cooled before the introduction of the filling gas. The filling gas cools rapidly by means of heat transfer to the pressure container, whereby the filling capacity of the pressure container is considerably increased. Said method is particularly suitable for the filling of small tanks, in particular, for gas-driven vehicles and fuel-cell systems.

8 Claims, 1 Drawing Sheet

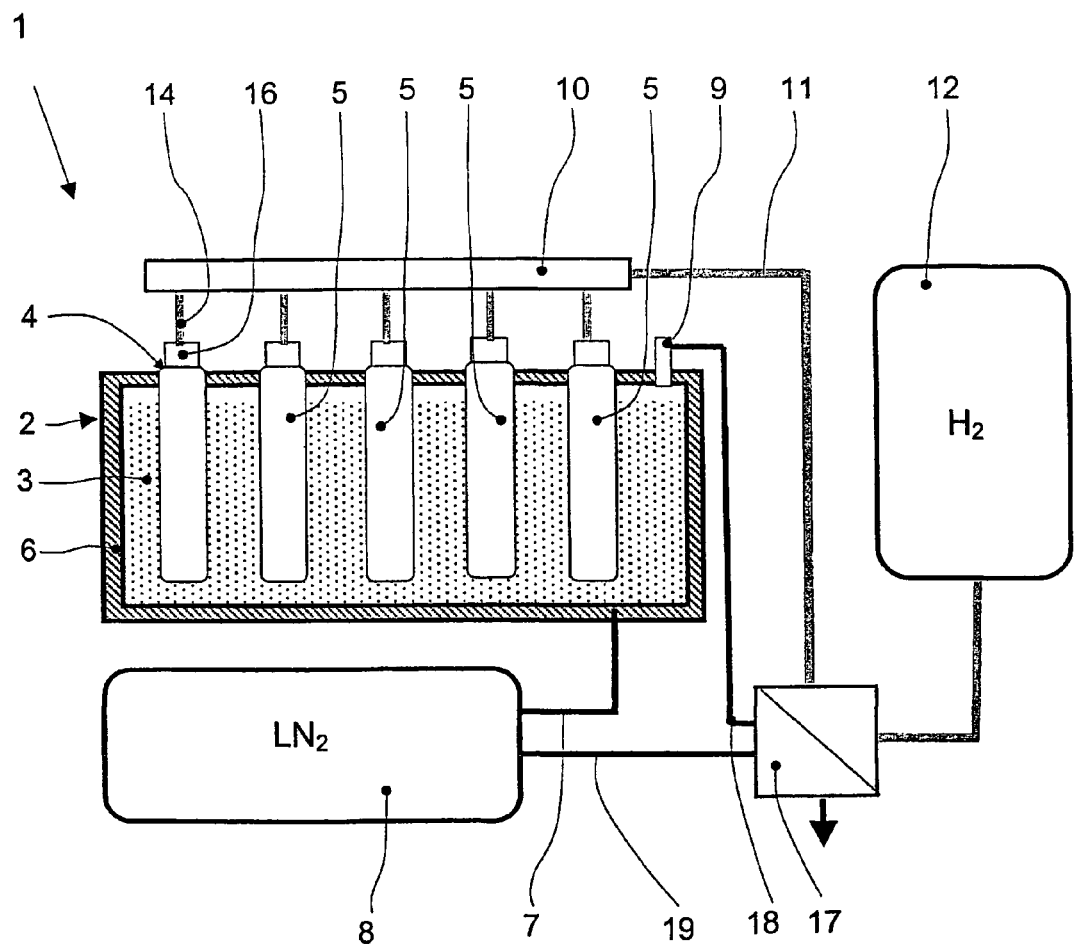

METHOD AND DEVICE FOR FILLING PRESSURE CONTAINERS WITH LOW-BOILING PERMANENT GASES OR GAS MIXTURES

The invention relates to a process for filling pressure tanks with low-boiling permanent gases or gas mixtures.

The term "permanent gases or gas mixtures" is used here to refer to gases or gas mixtures that, due to the value of their critical temperature, cannot be liquefied at room temperature solely by increasing the pressure. Particularly hydrogen and natural gas are of special economic significance here, since they are used, for example, as sources of energy in vehicle tanks for fuel cell drives.

In order to be able to store gases with a high storage density, they are stored either in the liquid state or in the gaseous state under high pressures. Storage in the liquid state allows a very high storage density, but it is only possible by accepting a certain amount of evaporation loss which is unavoidable, even with tanks that have good thermal insulation.

Until now, in order to store gases under pressure, mainly compressors have been used that allow an operating pressure in the pressure tank of about 200 bar. The compressors, however, are very complex to build and to operate, and moreover, some of the more recent applications, especially in fuel cell technology, call for far higher pressures of 700 bar or more. Such pressures cannot be achieved at all or only at an unacceptable cost using conventional compression technology.

A solution can be found in the process of cold filling that is described, for example, in European Patent EP 0 033 386 A1 or World Patent WO 99/5465. Here, the gas to be filled into the pressure tank is liquefied before the filling or else it is cooled off to a temperature that is only slightly above its boiling point. The preferred coolant here is liquefied nitrogen. Since the gas volume behaves approximately proportionally to the temperature during cooling (while the pressure remains constant), this procedure achieves an increase of the effective storage capacity by a factor of about 2 to 3. Since the internal pressure increases drastically when the tank is heated, either a good insulation of the tank is necessary, or else the tanks have to be designed to withstand high internal pressures.

The known methods that work with cold filling entail substantial drawbacks. On the one hand, hydrogen can only be liquefied at great cost. On the other hand, filling the pressure tank with cold gas causes warming because the gas comes into contact with the pressure tank being filled already during the filling procedure, thus leading to an expansion of the gas, as a result of which the subsequent pressure increases and consequently the achievable storage capacity is markedly reduced.

Accordingly, the objective of the present invention is to create an inexpensive process and a device for filling a pressure tank with gas which allows storage under high pressures.

Therefore, according to the invention, the pressure tank is cooled before or during the filling with gas. The filling gas cools off at the tank wall during the filling, which causes its volume to decrease. Since the pressure tank is cooled—in contrast to the cold filling process according to the state of the art—the compression is not partially reversed due to the contact of the filling gas with the pressure tank during the filling procedure. As a result, when the pressure tank subsequently warms up, an increase in the internal pressure of up to five times the filling pressure can be achieved.

The filling gas can be fed into the pressure tank in the warm state as well as in the cooled state. However, by pre-cooling the pressure tank, the effective storage capacity can be further increased. Suitable cooling can be carried out, for example, with liquefied nitrogen.

The achievable storage capacity is primarily determined by the pressure of the filling gas during the filling procedure. At filling pressures above 100 bar and a temperature of 77K (−196° C. [−320.8° F.]), the process according to the invention makes it possible to increase the pressure by a factor of about five. If the filling gas is under a pressure of, for instance, 200 to 250 bar during the filling, then permissible internal pressures of 1000 to over 1200 bar can also be achieved in modern composite tanks.

It is especially advantageous to cool the pressure tank in a coolant bath containing liquefied nitrogen before the filling gas is fed in and to thus bring it to a temperature that at least approximates the temperature of the liquefied nitrogen.

Preferably, through the heat contact with the pressure tank and/or in the pre-cooler, the filling gas is brought to a temperature that lies above its boiling point. In other words, the filling gas is filled in while in the gaseous state. Consequently, the liquefaction of the filling gas, which is especially complex in the case of hydrogen, can be dispensed with.

The objective according to the invention is also achieved by a device with the features according to patent claim 6.

The device according to the invention has a coolant bath that can be filled with a coolant, for example, nitrogen, and that is suitable to detachably receive at least one pressure tank. Moreover, the device according to the invention has a filling line for filling the pressure tank or tanks with a filling gas, for example, hydrogen, which is in flow connection with a filling gas reservoir, for example, a tank, a line or a gas generation means, and which is equipped with a connection for detachably connecting it to the pressure tank.

As the filling gas reservoir for filling pressure tanks with hydrogen, a preferred embodiment provides a hydrogen intermediate pressure tank that allows long-term storage of hydrogen in the liquid state.

Advantageously, the filling line, between the filling gas reservoir and the connection for the pressure tank or tanks, passes through a heat exchanger that is operated with a coolant, preferably liquefied nitrogen, that cools the filling gas at least approximately to the temperature of the coolant, that is to say, for example, the temperature of the liquefied nitrogen.

Preferred uses of the process according to the invention include the filling of pressure tanks, for instance, vehicle tanks or power storage units for cellular phones or laptop computers. Fuel cell drives are increasingly being seen as a viable alternative to conventional drives for vehicles. As a reactant, fuel cells require a chemical energy source, normally hydrogen, and oxygen. Whereas the oxygen, like with a combustion engine, can usually be taken from the ambient air, storage systems are needed for the hydrogen. Here, the hydrogen is either stored directly or as a component of another substance, for example, methanol or natural gas However, whereas the storage of hydrogen in the form of methanol calls for a relatively complex and expensive system in order to utilize the hydrogen energy (reformer), systems that store the hydrogen directly, especially in gaseous form under pressure, are easier to construct and to use. Compact fuel cells can, for example, serve as ideal energy sources for laptop computers or cellular telephones.

An embodiment of the invention will be explained in greater depth below on the basis of the drawing.

The single drawing (FIG. 1) schematically shows a device according to the invention for filling pressure tanks with hydrogen.

The device 1 comprises a coolant bath 2 in whose upper area there are feed openings 4 for the pressure tanks 5 that are to be filled. The coolant bath 2 is flow-connected via a feed line 7 to a tank 8 for liquefied nitrogen. In the operating state, the coolant bath 2 is filled with liquefied nitrogen in such a way that, after the pressure tank 5 is put into it, liquefied nitrogen flows around at least most of the pressure tank 5. The outer walls of the coolant bath are provided with thermal insulation 6 which prevents a rapid evaporation of the liquefied nitrogen 3 from the coolant bath 2. A gas discharge line 9 serves to carry evaporated nitrogen away.

At a distance from the feed openings 4 of the coolant bath 2, there is a connection fitting 10 that is in flow connection via a filling line 11 with a hydrogen reservoir 12. This hydrogen reservoir 12 can be, for example, a pressure tank in which the hydrogen is stored at room temperature under high pressures, for instance, 200 bar, or else a thermally insulated intermediate pressure tank that is filled with liquefied hydrogen. The connection fitting 10 is provided with one or more filling hoses 14 that can be detachably connected to the pressure tanks 5. The number of filling hoses 14 depends on the maximum number of pressure tanks 5 that can be attached to the connection fitting 10. Thus, the embodiment has a total of five filling hoses 14.

When the device 1 is properly used, the pressure tanks 5 that are to be filled are placed into the feed openings 4 of the coolant bath 2 that is filled with liquefied nitrogen 3 and affixed there in a detachable manner not shown here. When the pressure tank 5 is taken out of the coolant bath 2, part of the liquefied nitrogen 3 evaporates and this is carried away via the gas discharge line 9. It is replenished with liquefied nitrogen that is taken from the tank 8. In the operating state of the coolant bath 2, liquefied nitrogen 3 flows essentially all around the pressure tanks 5.

Subsequently, the pressure tanks 5 are connected to the filling hoses 14 and valves 17 on the pressure tanks 5 are opened. The hydrogen intended for filling into the pressure tanks 5 is taken from the hydrogen reservoir 12. It can be pre-cooled in a heat exchanger 16. The heat exchanger 16 here is either operated with liquefied nitrogen that can be taken directly from the tank 8 via a line 19, or else with cold gaseous nitrogen stemming from the evaporation in the coolant bath 2, which is supplied via a flow connection 18 with the gas discharge line 9. The latter arrangement better utilizes the cold energy of the nitrogen, thereby increasing the cost-effectiveness of the process.

It is also possible to obtain the hydrogen in the cold gaseous or liquid state from an intermediate pressure tank. In this case, the installation of a heat exchanger 17 can be dispensed with.

Preferably, the hydrogen in the hydrogen reservoir 12 is under pressure and/or is brought to a certain filling pressure by suitable means, for example, compressors, before reaching the connection fitting 10. It is also conceivable to use a pressure tank 5 that was already filled at high pressure in the device 1 as the hydrogen reservoir 12 for the filling of additional, preferably smaller pressure tanks.

The hydrogen flows through the connection fitting 10 into the filling hoses 14 and from there into the pressure tank 5. As a result of the cooling in the heat exchanger 17 or through contact with the pressure tanks 5 that have been brought to the nitrogen temperature, the hydrogen compresses a great deal. The filling procedure can be terminated at any time, before a pressure equilibrium is reached between the pressure tank 5 and the hydrogen reservoir 12. After the filling procedure has been completed, the valves 16 are closed and the pressure tank is taken out of the coolant bath 2. As a result of the subsequent warming up of the pressure tank 5 to the outside temperature, the pressure in the tanks rises drastically to an operating pressure of, for example, 400 to 1200 bar, something which can only be achieved with compression technology at a disproportionately high cost.

The process makes it possible to fill the pressure tanks extremely quickly. Effects encountered in the prior art processes that reduce the compression of the gas when the filled cold gas warms up as a result of contact with the warm tank are avoided. The device is especially well-suited for filling vehicle tanks. Such tanks, which can have a capacity of 100 to 500 liters in a mid-sized car, can be divided up into modules that can be separated from each other, each having a capacity of 10 to 50 liters. In order to fill them, the modules are each immersed into a bath with liquefied nitrogen and filled with a gaseous fuel, for example, hydrogen or natural gas. Another application possibility for the device according to the invention is the filling of compact pressure tanks or cartridges for fuel cell systems that can be used as power sources, for example, for cellular telephones or portable computers.

EXAMPLE

Hydrogen from a 200 bar cylinder bank as the hydrogen reservoir 12 is fed into a pressure tank 5 that can hold 10 liters. During the filling procedure, the pressure tank 5 is immersed into liquefied nitrogen at a temperature of about 77K (−196° C. [−320.8° F.]). A pre-cooling of the fed-in hydrogen is not fundamentally necessary here but it can serve to improve the cost-effectiveness. The hydrogen from the reservoir flows through the open valve 16 into the receiving pressure tank 5 and cools off there. After about 2 minutes, a pressure equilibrium is established between the bundle of cylinders and the pressure tank; the maximum possible hydrogen density in the pressure tank has been reached. The filling procedure is terminated by closing the valve 16. Subsequently, the pressure tank is taken out of the coolant bath. During the subsequent warming of the pressure tank to the outside temperature, a pressure of about 1000 bar is reached in the pressure tank.

LIST OF REFERENCE NUMERALS 1 hydrogen storage system
2 coolant bath
3 liquefied nitrogen
4 feed openings
5 pressure tank
6 thermal insulation
7 feed line
8 tank
9 gas discharge line
10 connection fitting
11 filling line
12 hydrogen reservoir
13 —
14 filling hose
15 —
16 valves
17 heat exchanger
18 flow connection
19 line

The invention claimed is:

1. A process for filling pressure tanks (5) with a low-boiling permanent gaseous gas or gas mixture in which a gas or gas mixture as the filling gas is fed into a pressure tank (5), whereby the pressure tank (5) is cooled before or during the filling with gas, wherein the filling gas is filled while in the gaseous state and the filling gas is stored at a temperature above its boiling point, and the filling gas is cooled in a pre-cooler (17) before being fed into the pressure tank (5).

2. The process according to claim 1, characterized in that, through heat contact with the pressure tank (5) and/or in the pre-cooler (17), the filling gas is cooled to a temperature that lies above its boiling point.

3. A device for carrying out the process according to claim 1 having a coolant bath (2) to detachably receive at least one pressure tank (5), and having a filling line (11) that is in flow connection with a filling gas reservoir (12) and that is equipped with a connection (10) for detachably connecting it to the pressure tank or tanks (5), and a hydrogen intermediate pressure tank is provided as the filling gas reservoir (12).

4. The device according to claim 3, characterized in that the filling line (11), between the filling gas reservoir (12) and the connection (10) for the pressure tank (5), passes through a heat exchanger (18) that is operated with a coolant.

5. The device according to claim 4, characterized in that the coolant is liquefied or cold gaseous nitrogen.

6. A device for carrying out the process according to claim 1 having a coolant bath (2) to detachably receive at least one pressure tank (5), and having a filling line (11) that is in flow connection with a filling gas reservoir (12) and that is equipped with a connection (10) for detachably connecting it to the pressure tank or tanks (5), and the filling line (11), between the filling gas reservoir (12) and the connection (10) for the pressure tank (5), passing through a heat exchanger (18) that is operated with a coolant.

7. A process according to claim 1, characterized in feeding the filling gas into a pressure tank of fuel cells and/or vehicles powered by gaseous fuel, and cooling the pressure tank before or during the filling with gas.

8. A process for filling pressure tanks (5) with a low-boiling permanent gaseous gas or gas mixture in which a gas or gas mixture as the filling gas is fed into a pressure tank (5), whereby the pressure tank (5) is cooled before or during the filling with gas, wherein the filling gas is filled while in the gaseous state and the filling gas is stored at a temperature above its boiling point, and through heat contact with the pressure tank (5), the filling gas is cooled to a temperature that lies above its boiling point.

\* \* \* \* \*